May 20, 1952 E. M. DELORAINE ET AL 2,596,989

AUTOMATIC ELECTRONIC SWITCHING BY TIME DELAY SIGNAL FOR TELEPHONE SYSTEMS

Filed May 17, 1950 6 Sheets-Sheet 1

INVENTORS
EDMOND M. DELORAINE
PAUL R. ADAMS

BY

ATTORNEY

May 20, 1952 | E. M. DELORAINE ET AL | 2,596,989

AUTOMATIC ELECTRONIC SWITCHING BY TIME DELAY SIGNAL FOR TELEPHONE SYSTEMS

Filed May 17, 1950 | 6 Sheets-Sheet 2

INVENTORS
EDMOND M. DELORAINE
PAUL R. ADAMS

BY

R P Morris

ATTORNEY

INVENTORS
EDMOND M. DELORAINE
PAUL R. ADAMS

BY

R P Morris
ATTORNEY

INVENTORS
EDMOND M. DELORAINE
PAUL R. ADAMS
BY
R. P. Morris
ATTORNEY

INVENTORS
EDMOND M. DELORAINE
PAUL R. ADAMS
BY
[signature]
ATTORNEY

INVENTORS
EDMOND M. DELORAINE
PAUL R. ADAMS
BY
RPMorris
ATTORNEY

Patented May 20, 1952 2,596,989

UNITED STATES PATENT OFFICE 2,596,989

AUTOMATIC ELECTRONIC SWITCHING BY TIME DELAY SIGNAL FOR TELEPHONE SYSTEMS

Edmond M. Deloraine, New York, N. Y., and Paul R. Adams, Cranford, N. J., assignors to Federal Telephone and Radio Corporation, New York, N. Y., a corporation of Delaware Continuation of application Serial No. 629,296, November 17, 1945. This application May 17, 1950, Serial No. 162,520

9 Claims. (Cl. 179—15)

This invention relates to communication systems and more particularly to exchange systems for use in telephony.

This application is a continuation of application 629,296, filed November 17, 1945, now abandoned.

In a telephone system described in a copending application of E. M. Deloraine, Serial No. 628,613, filed Nov. 14, 1945, (now abandoned, and refiled as a continuation application on May 13, 1950, Serial No. 161,831) now Patent No. 2,584,987, granted February 12, 1952, an exchange is described wherein a switching or interconnection of lines is effected by producing a relative time displacement of the energy of a calling line with respect to a called line, the lines all being connected to a distributor system so that each line has a predetermined time displacement in a given cycle. The effective time displacement is produced so as to delay the communication energy of the calling line by an interval corresponding to the time interval of the scanning cycle between the called and the calling line.

In accordance with our invention, we provide a system for interconnecting two lines or channels having a predetermined time position with respect to one another wherein the energy of one channel is stored and is later released after a time interval corresponding to the time displacement of the two channels to be interconnected.

It is an object of our invention to provide a switching system for interconnecting any two channels of a plurality of channels for transfer of communication in which each of the channels is given a predetermined time spacing and interconnection is effected by storing the indication signals and applying them to interconnecting means after an interval equal to substantially the difference in time position assigned to the channels to be interconnected.

It is a further object of our invention to provide a system for transferring energy incoming at a predetermined timing to an outgoing circuit at a different predetermined timing wherein there is provided means for storing the incoming energy and means for releasing the stored energy to the outgoing circuit after a time interval corresponding to the difference in the timing between the incoming and outgoing circuits.

It is a still further object of our invention in a communication exchange system to provide means for assigning to each channel of the communication system a predetermined time interval, means for storing the energy incoming over a calling channel, counting means responsive to incoming dialing signals for counting a predetermined time interval corresponding substantially to the time displacement between the calling channel and a called channel and releasing said stored energy under control of said counting circuit whereby the calling and called lines may be interconnected for transfer communication signals.

Our invention is best illustrated in connection with a system such as disclosed in the aforementioned application wherein, the signal or speech currents in the various lines or other channels are replaced at the exchange by a series of narrow pulses of amplitude corresponding to the amplitude of the original current at the corresponding time. The pulses are produced at sufficient rapidity so that they define substantially the signal envelope. In this manner by allotting different time positions to each line, the signal or voice currents within the exchange may be distributed over a common channel each signal being repeated by a series of pulses displaced in time in accordance with the distributor time position. This distribution may be readily accomplished by means of a cathode ray tube serving as a distributor which will sequentially scan the lines connected to predetermined terminals and respond if there is a signalling voltage on the line. The channels may be separated by time selection and may be applied through time displacement means and a low-pass filter which serves to reproduce the audio envelope to the same or another distributor also coupled to the lines. The incoming signals may serve to adjust the time displacement means so that they will represent the time difference between the time position of the calling line and the selected called line. The time displacement means comprises a circuit which, while not producing an actual delay of the signals, will effectively serve to store the energy and release it after a predetermined interval equal to the desired delay. In this manner, the interconnection of any one line with any other line of the system may be accomplished. Upon making this interconnection, the communication signals may pass through the same delay means between the interconnected lines. Furthermore, since the scanning cycle covers each of the lines connected to the distributor, as many simultaneous connections may be made as there are time displacement trunking channels within the exchange.

Preferably, means are provided responsive to the interconnection of the lines to tie up these lines so that they cannot be selected by another subscriber attempting to get the connection. If desired, any conventional type of busy signal may be applied to the subscriber's line when this condition exists so that he will know that he must wait an interval for the line to become free so that he can make the desired connection.

While we have broadly outlined certain objects and features of our invention, a better understanding of our invention and the objects and features thereof may be had from the particular description of an embodiment and certain modifications thereof made with reference to the accompanying drawings, in which.

Figure 4:
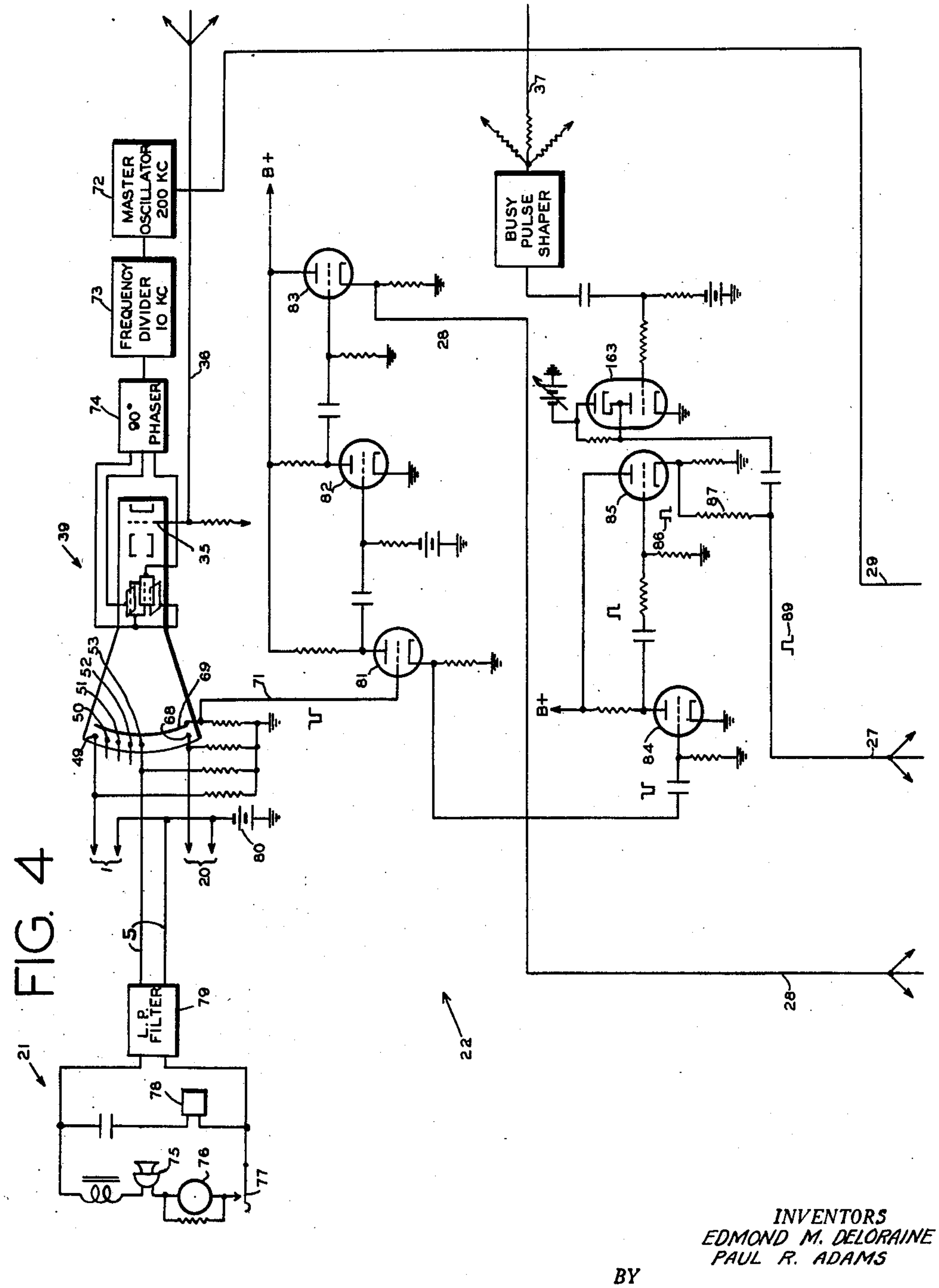
Figure 5:
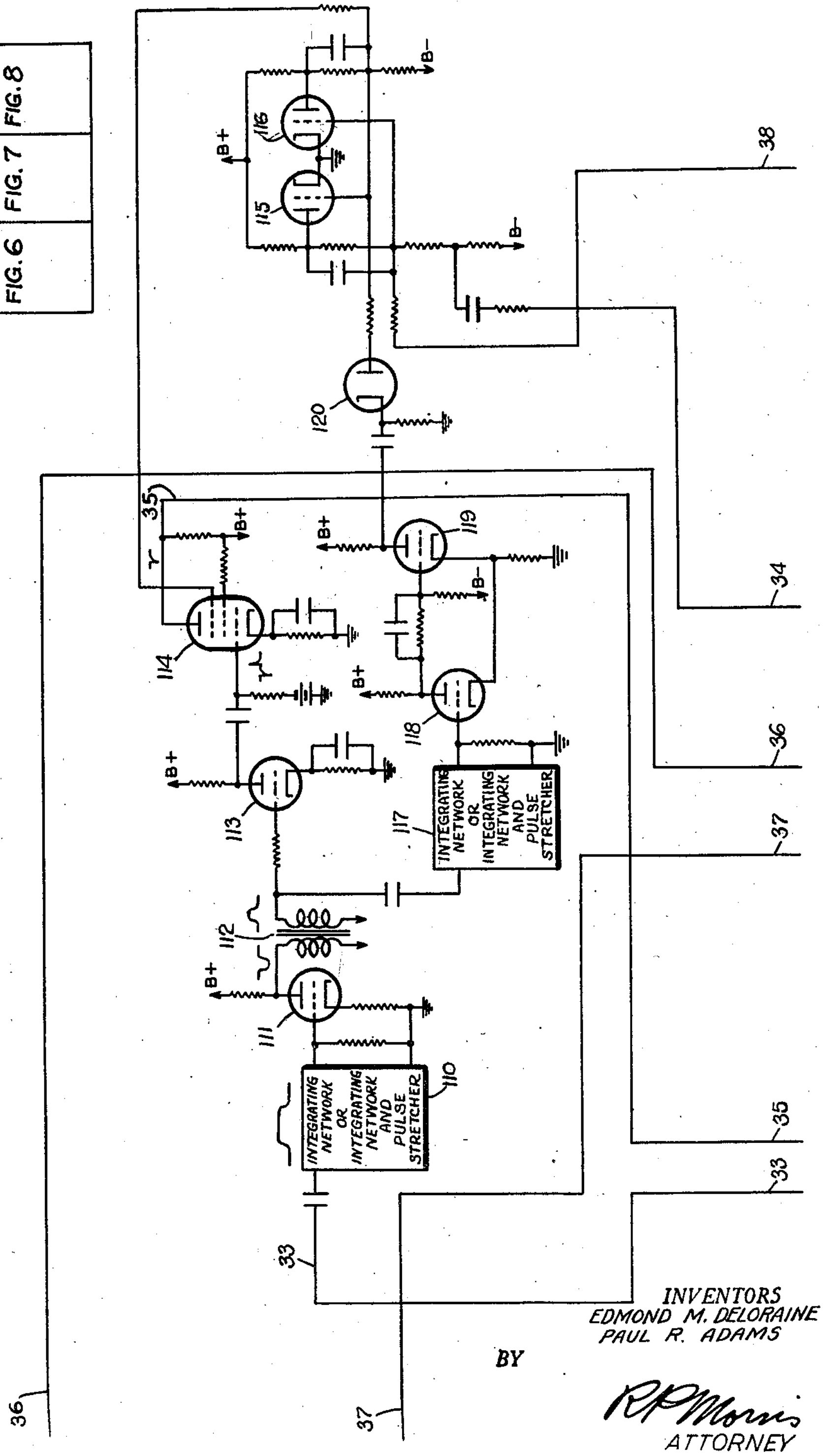
Figure 6:
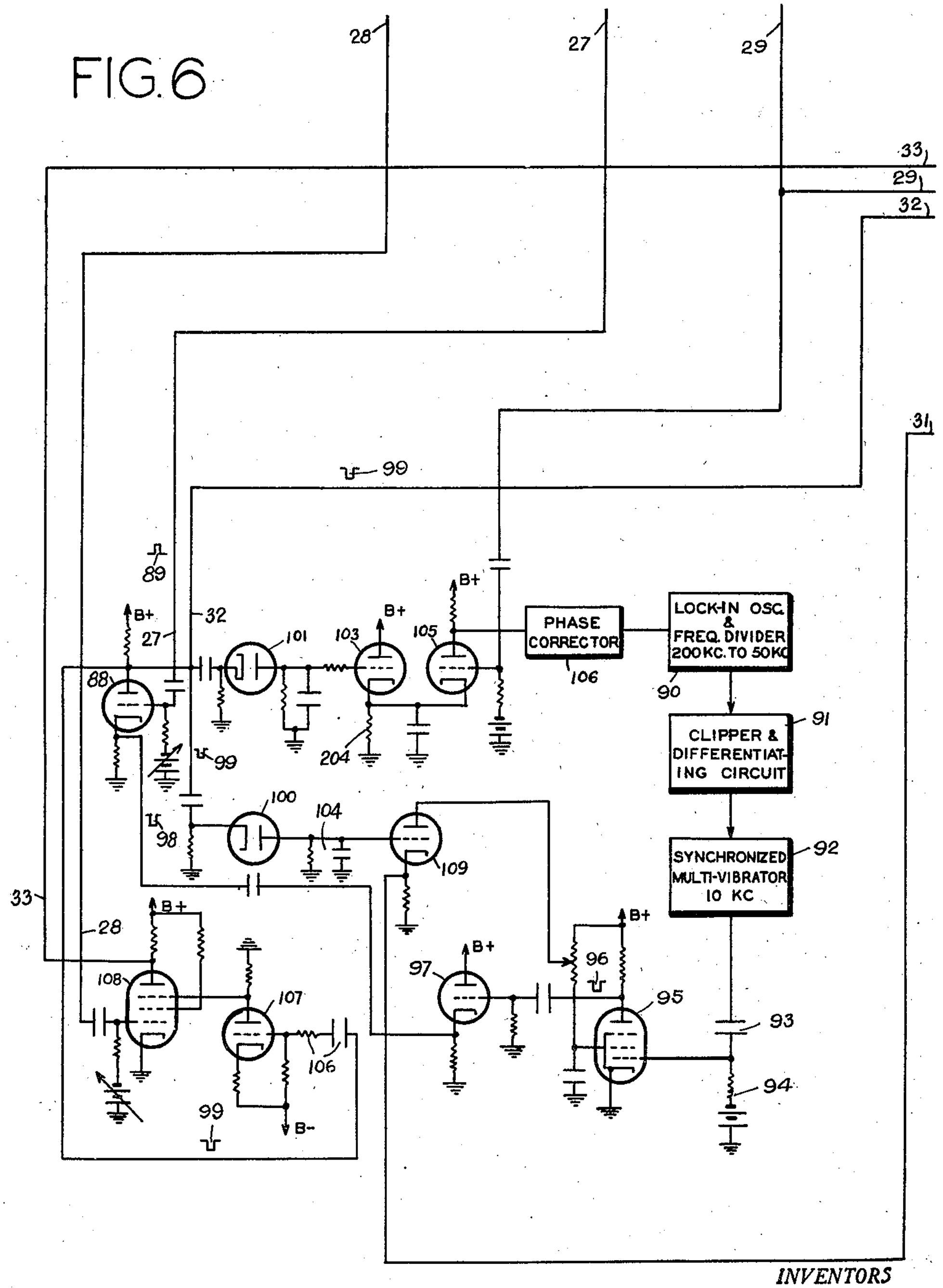
Figure 7:
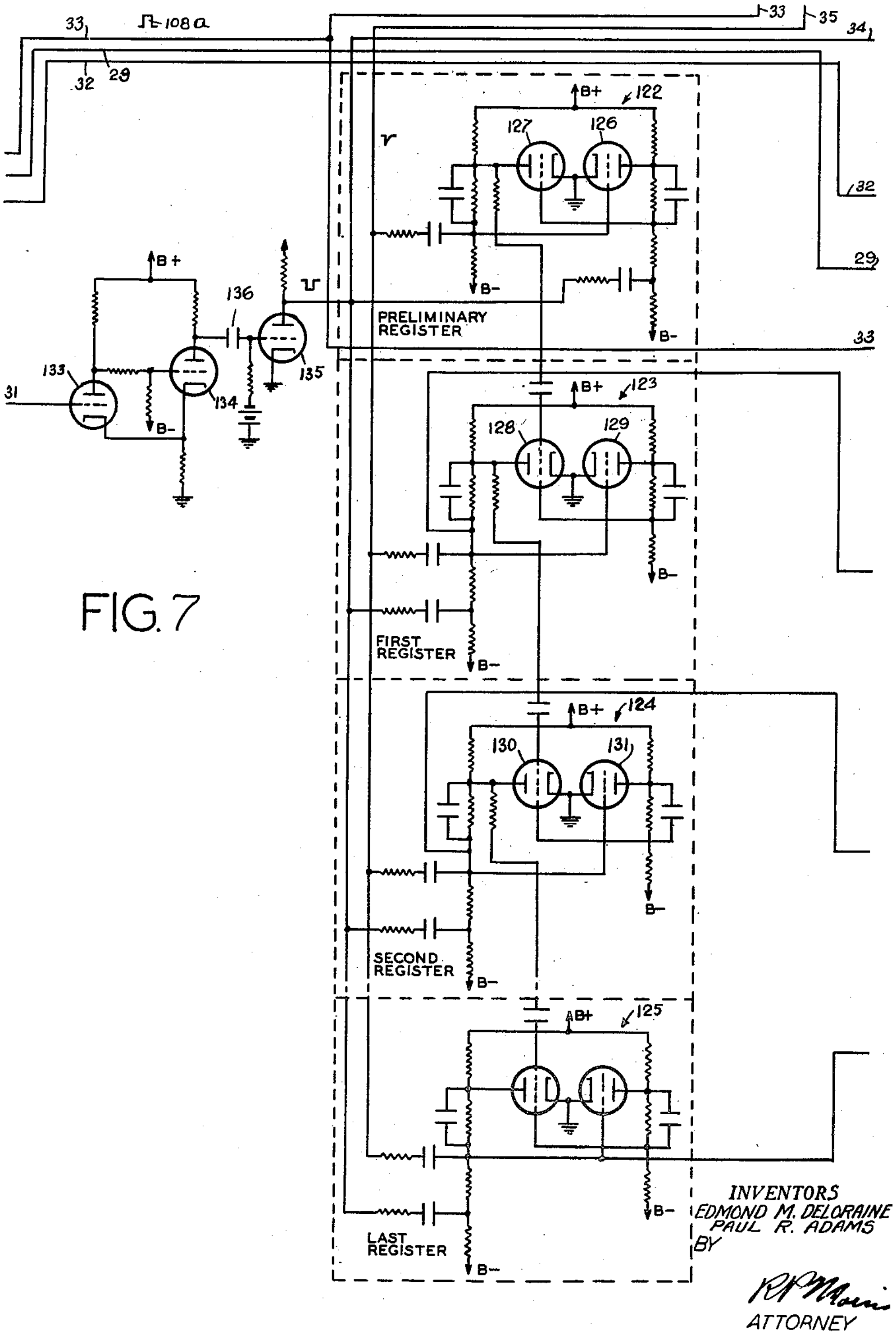

Figs. 4 to 8 inclusive, constitute a circuit diagram of a link exchange in accordance with our invention;

Fig. 4 illustrating the common equipment;

Fig. 5 showing the pulse forming equipment;

Fig. 6 the line finder equipment;

Fig. 7 the dial register equipment; and

Figure 8:
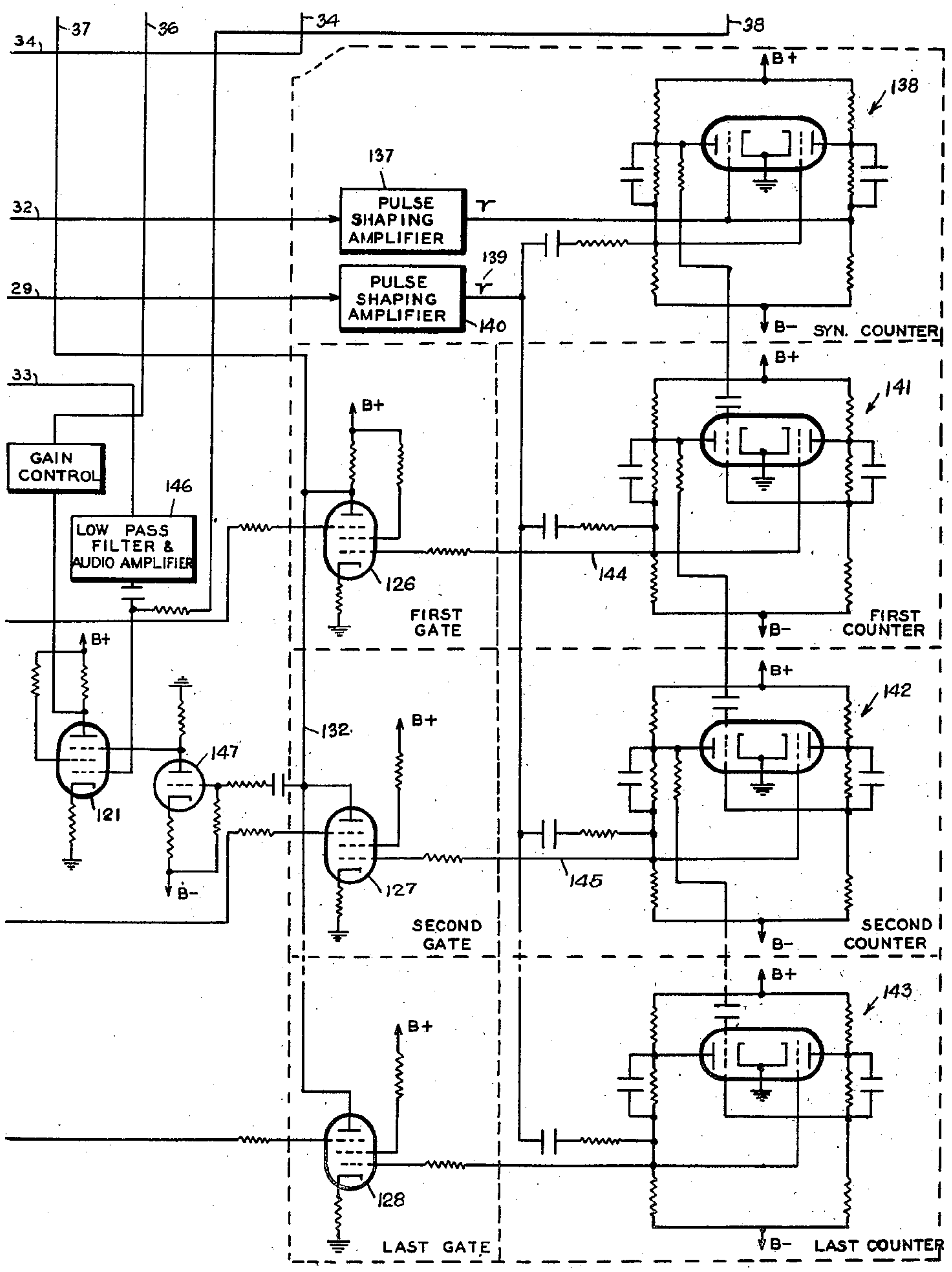

Fig. 8 the line selecting equipment; and

Figure 9:
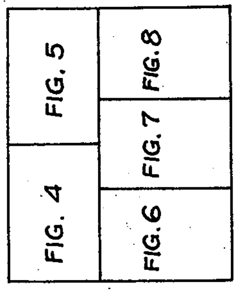

Fig. 9 is a diagram illustrating how Figs. 4 to 8 inclusive, should be arranged to illustrate the complete circuit.

Figure 1:
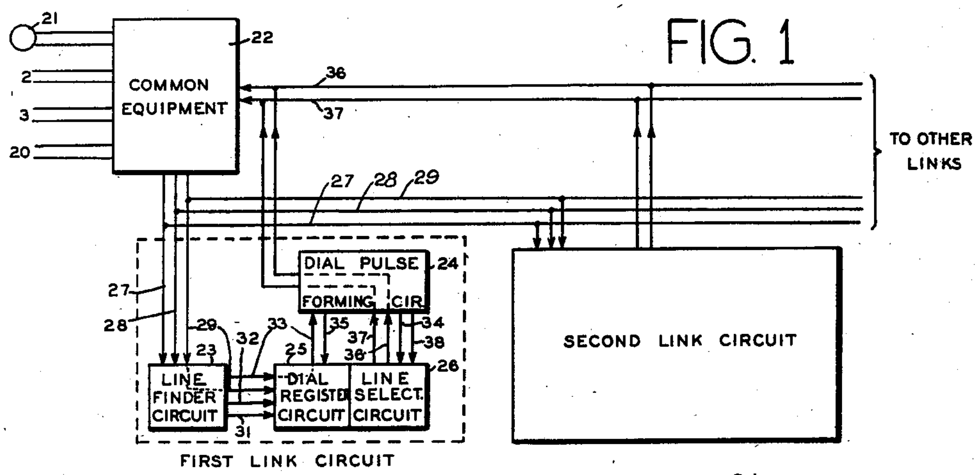
Fig. 1 is a block diagram illustrating the general circuit set up.

In an example of the system as outlined above, the system may be divided into three parts as shown in Fig. 1: first, all the subscribers' lines, twenty for example, assigned numerals 1 to 20, each of these lines having a subscriber subset equipment such as 21; second, the equipment common to all line circuits, hereafter referred to as common equipment 22; and third, a group of link circuits one of which is needed for each simultaneous call. Each of the link circuits may be further sub-divided into line finder circuit 23, dial pulse forming circuit 24, dial register circuit 25 and line selecting circuit 26. These several major components are interconnected by wires 27—38 inclusive, as shown in Fig. 1. For the sake of simplicity in the description only one-way conversation is illustrated.

As shown, all lines 1 to 20 terminate in common equipment 22. This equipment 22 performs a scanning function, preferably by means of a suitable tube having an electronic beam which sweeps each of the lines in turn.

When one of these lines has a potential indicative of a calling condition, the common equipment 22 applies signals over wires 27 and 28 to all the link circuits in parallel and specifically to the line finder circuit 23 of the first link (chosen for discussion). This line finder 23 operates to find the calling line and transfer the signals over wire 33 to the dial pulse forming circuit 24.

When dialing ensues, this circuit 24 produces dial pulses which are counted and stored in dial register circuit 25. The dial pulse register 25 then serves to control the line selector circuit 26 which may comprise a delay line or other time displacement apparatus.

The incoming speech signals are then transferred from common equipment 22 over wire 28, line finder circuit 23, wire 33, line selector circuit 26 and thence over wire 36 back to the common equipment 22, from whence they are applied to the selected outgoing line. The part of Fig. 1 comprising line finder 23, dial pulse forming circuit 24, dial register 25 and line selector circuit 26 may be considered together as a link circuit. For certain embodiments of the system, a synchronizing frequency may be fed from common equipment 22 over lead 29 to line selector circuit 26 and line finder circuit 23 respectively. The five leads 27, 28, 29, 36 and 37 to and from common equipment 22 may also be multipled to other link circuits of the system as shown.

Figures 2, 3:
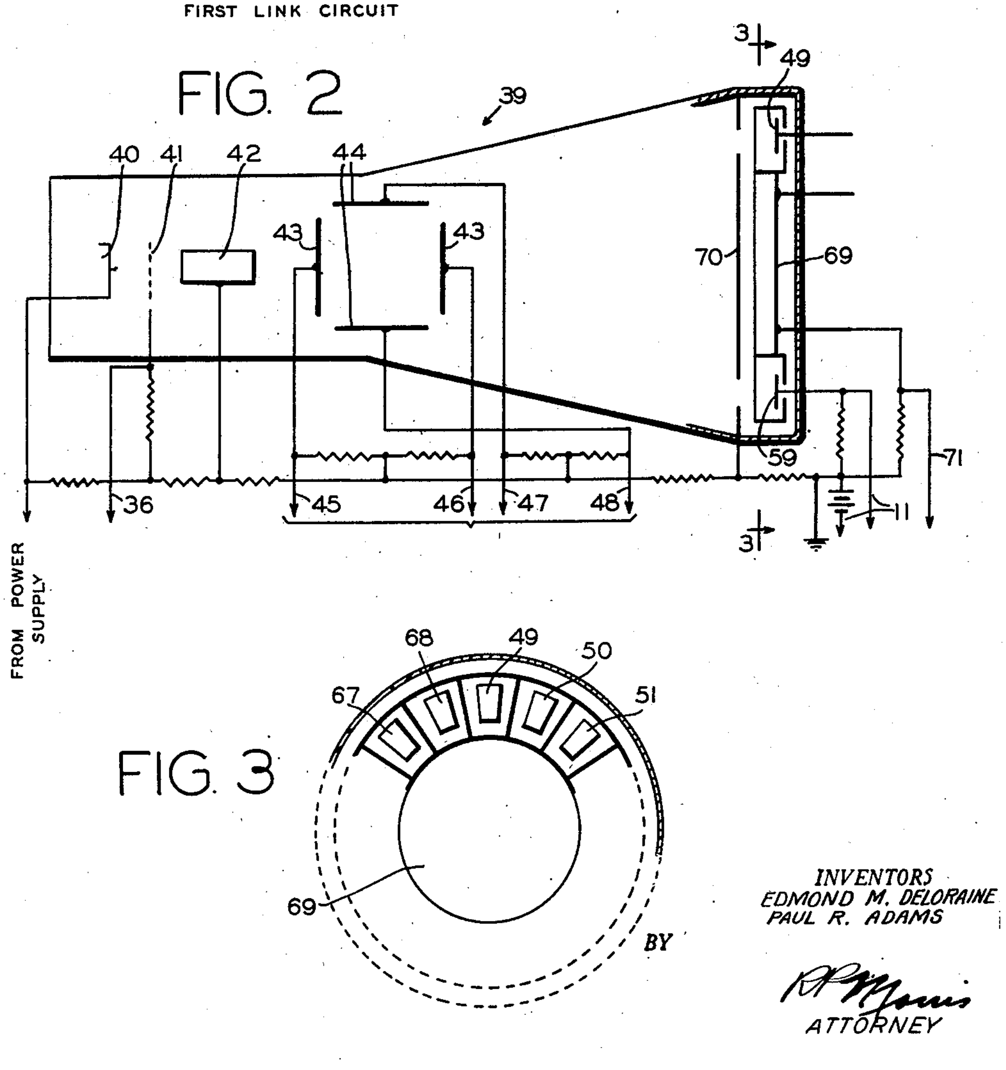
Figs. 2 and 3 are sectional circuit diagrams and views respectively, of a distributor tube used in our system.

The distributor function of common equipment 22 may be performed by a rotating distributor in the form of a cathode ray tube as illustrated in detail in Figs. 2 and 3. The distributor tube is indicated generally at 39 and may comprise a cathode 40, the usual grid 41, focus and anode electrode 42, horizontal deflector plates 43 and vertical deflector plates 44. Two-phase distributor currents from a suitable sweep control may be applied over leads 45, 46, 47 and 48 to the horizontal and vertical deflector plates respectively, so as to produce a cyclic rotation of the electron beam. At the target end of tube 39 are provided twenty coupling targets 49 to 68 respectively, which are coupled with the individual lines 1 to 20 inclusive. These targets may comprise secondary electron emissive elements associated with a common anode 69 to provide dynodes all having a common output. A mask or screen 70 may be provided, if desired, having apertures therein so that the electron beam will impinge on each dynode only when the beam is aligned therewith thus preventing possible secondary emission from others. The output of the distributor tube 39 is connected from anode 69 over lead 71, then signal isolating circuits hereafter described to leads 27 and 28 which go to the line finder circuit as shown in Fig. 1. The output from the line selecting circuit 26 may be applied as indicated over line 36 to the grid 41 serving to modulate the beam in accordance with the selected signal energy. Thus, referring to Fig. 1, the output from lead 71 may be applied after suitable delay (produced in line selecting equipment 26 as hereafter described) over lead 36 to grid 41 to provide the desired communication channel between the chosen pair of lines.

The common equipment 22 is illustrated in Fig. 4. For illustrative purposes a base frequency of 10,000 cycles per second has been selected as the scanning rate of the rotating distributor. This frequency is sufficiently high to reproduce voice frequencies with adequate fidelity for transmission of speech. For the twenty-line system the base frequency is derived from a 200 kilocycle stable oscillator 72 preferably crystal controlled. This higher frequency is preferably utilized since it is generally easier to build a more stable oscillator at the higher frequencies than at the lower 10,000 cycle frequency which is to be used. Furthermore, in certain of the modifications illustrated, the 200 kilocycle wave may be utilized for other control purposes. The sinusoidal frequency generated in master oscillator 72 is reduced to the base frequency of ten kilocycles in frequency divider 73.

The output of frequency divider 73 is applied over 90° phase shifter 74 to the vertical and horizontal sets of deflecting plates 43 and 44 of distributor tube 39 herein diagrammatically illustrated. This will serve to rotate the beam at a frequency of 10,000 revolutions per second so that each of the dynodes 49 to 68, illustrated in Figs. 2 and 3 and in this figure, will be scanned once every 10,000ths of a second. Incoming lines 1, 5 and 20 are shown connected to the respective dynodes 49, 53 and 68.

At 21 is illustrated a typical subscriber sub-set (shown connected to line 5) for use in the system according to our invention. Such a sub-set will be connected to each of the incoming lines 1 to 20 inclusive. The voice transmitter 75 is connected in series with dial 76 and the normally open switch hook 77. The receiver 78 is bridged permanently across the line, since, for simplicity of illustration, no separate ringing equipment has been illustrated. Accordingly, the signal for summoning a called subscriber may be applied as a special tone which will be reproduced in receiver 78 to call the listener to the phone.

As in the usual equipment, switch hook 77 is normally open. However, upon initiating a call, the switch becomes closed, completing a circuit in the calling line loop over low-pass filter 79 and the associated lines at the sub-set, applying a negative potential from battery 80 to the associated dynode 53. Normally the dynode electrodes 49 to 68 are at the same potential as anode 69 so no current flows. This negative potential will produce a difference in potential and cause secondary emission current to flow from the dynodes upon impingement of the beam of tube 39 thereon, producing a negative output pulse in output line 71. The pulses are preferably signal modulated to a depth of only 25 to 50 per cent so that there will always be sufficient amplitude to furnish energy to establish and maintain connections regardless of modulating signals. The negative pulses resulting from operation of the selected dynode 53 are fed to the grid of inverter tube 81. The anode circuit of tube 81 is coupled to the grid of clipper tube 82 which serves to clip these pulses at a predetermined level to pass only the modulated portions of the incoming pulses. Thus, the output of this tube, representing the speech signals, may be substantially 100 per cent modulated. These clipped pulses are then applied to a cathode follower tube 83 and from there to all of the link circuits over the cathode follower output lead 28. A second output is taken across the cathode resistance of inverter tube 81, these pulses being applied to a clipper tube 84 which serves to clip the pulses to a constant level eliminating modulation effects therefrom. The anode circuit of tube 84 is coupled to the grid of a cathode follower tube 85 which serves to apply pulses 86 through common feed resistor 87 over wire 27 to the grid of line finder selector gate tube 88 (shown in Fig. 6) of line finder 23 (shown in Figs. 6 and 1) in the first link circuit (now under consideration) and in parallel to the grids of the corresponding line finder gate tubes in all other links. The pulse 86 after passing through resistor 87 may be called 89, so that the pulse actually arriving at the grid of tube 88 and of the other similar tubes is pulse 89. Under the conditions now assumed, when none of the grids of the line finder gate tubes is drawing grid current, pulse 89 is nearly as strong as pulse 86; but under other conditions it may be much weaker than 86 as hereafter explained. In the absence of any signals on the cathode of this line finder gate tube 88, the above traced pulse 89 on its grid is insufficient to cause the flow of plate current, because of the bias applied to the grid is sufficiently far below cutoff.

In the line finder 23 is provided a lock-in oscillator 90. Oscillator 90 incidentally performs a frequency division and, moreover, is controlled through the medium of master oscillator 72. The lock-in oscillator 90 operates at a frequency slightly less than the two hundred kilocycles, its 50-kc. output being fed through a clipper differentiator circuit 91 to the ten kilocycle synchronized multivibrator 92. The output of this multivibrator 92 is applied through the differentiating network 93 and 94 to tube 95 which serves to form and amplify the pulses. Tube 95 is normally biased beyond cut-off but the leading edge of each square wave output from multivibrator 92 is of sufficient strength to first drive the grid positive on a portion of the square wave. A negative pulse 96 of approximately five microseconds is produced in the plate circuit. A cathode follower tube 97 passes the signal or control pulse 98 to the cathode of line finder tube 88. When the signal 89 on the grid of tube 88 coincides with the above-described selecting pulse 98, the tube 88 conducts and passes a pulse 99 to four places, namely to diodes 100 and 101 and over wire 32 to the line selecting circuit (Fig. 8).

This pulse 99 is rectified in tube 101 and fed to an integrating network 102. The negative potential from the integrator is amplified in tube 103 reducing the potential in cathode resistor 104 which is common to tube 103 and tube 105. The reduction of this potential renders tube 105 conductive. Thus, this tube 105 now commences to pass the sine wave from master oscillator 72, which is continuously applied to the grid thereof over line 29. This amplified wave is then passed through phase corrector circuit 106 serving to lock-in oscillator 90 with the master oscillator 72. Accordingly, progression of selection is now stopped so that the pulses 89 will pass through tube 88 to open line finder gate tube 108 at the correct instants, thus causing the latter to pass the desired signal pulses 89 from wire 28 to wire 33 as output pulses 108*a*.

Simultaneously, the application of pulses 99 to diode 100 actuates tubes 109 and 95 to prevent engagement of other line finders by providing blocking potentials as fully described in the aforementioned application. These details are not described herein as they constitute no essential feature of our invention.

A combination of a pulse register circuit incorporating the features of our invention and associated line selection circuit incorporating our invention is shown in Figs. 7 and 8 respectively. Also, a pulse forming circuit is illustrated in Fig. 5.

Turning first to Fig. 5, the incoming pulses 108 with their dialing breaks are passed through integrating network 110, amplifier tube 111, transformer 112, clipper tube 113 and dial gate tube 114.

Dial gate tube 114 in Fig. 5 is normally biased to conduction by the voltage on its suppressor from the dial gate control 115, 116 (with tube 115 normally conducting). The selected pulses from transformer 112 also pass integrating circuit 117 to the grid of tube 118 working in combination with tube 119 as a trigger circuit. Tube 119 cuts off at the beginning of a series of dial pulses (sending out an ineffective positive pulse over rectifier 120) and reoperates at the end, sending out a negative pulse to the dial gate control 115, 116. This negative pulse from tube 119 cuts off tube 115 causing tube 116 to conduct. This biases tube 114 to cut-off locking out the dial gate so that transients and voice modulations or even additional dialing will not disturb the registers. At the same time, a control voltage is sent out over lead 38 biasing the control grid of the output gate 121 (Fig. 8) for conduction.

Turning now to Figs. 7 and 8, the output line 35 is coupled to a plurality of trigger circuits 122, 123, 124 and 125. As many of these trigger circuits are provided as there are subscriber's lines. Normally, the right hand tubes of each pair (except for the preliminary one 122) are cut-off, biasing the respective gate tubes 126, 127 and 128 to cut-off on their associated suppressor grids. When a series of dial pulses has been received, it is intended that one of the right hand tubes will be left conducting, permitting its gate tube to pass the signal.

The operation of the register may be described as follows: The first trigger circuit 122 has no associated gate and tube 126 is normally conducting. A first pulse over wire 35 from the pulse forming circuit (Fig. 5) cuts off tube 126 of trigger circuit 122 causing tube 127 to conduct. When tube 126 conducts, a negative pulse is sent from its plate circuit to the grid of the normally conducting tube 128 of trigger circuit 123 cutting off this tube and causing tube 129 to conduct. This operation of tube 129 serves to open the first gate tube 126. The second negative pulse from the pulse forming circuit cuts off tube 129 transferring conduction to tube 128. A negative pulse from the plate of tube 128 cuts off tube 130 restoring the first gate (described later, Fig. 8) to blocked condition which transfers conduction to tube 131 in the next register 124. The cut-off of tube 129 restores the first gate tube 126 to blocked condition while the conduction of tube 131 unblocks the second gate tube 127. This cycle is repeated in succeeding registers until the last dial pulse has been sent.

Thus, at the end of dialing only the gate corresponding to the number of dial pulses is left unblocked. Assuming for convenience that line 3 is calling line 5, the second gate 127 will be unblocked. As a consequence then, any pulses which may arrive on the grids of the gate tubes will be passed only by gate 127 to the common output wire 132 as will be described in more detail in connection with Fig. 8.

After the calling subscriber has hung up, a release circuit for restoring the registers 122—125 to normal will be operated. This circuit is controlled by tubes 133, 134 and 135 normally cut-off. When the line finder 23 finds a line and locks-in, a signal is applied over line 31 from the cathode of tube 109 in Fig. 6 to tube 133 causing normally cut-off tube 134 to conduct. The resulting negative pulse from tube 134 is passed on to tube 135 over condenser 136 but is not effective since tube 135 is already cut off. However, when the line finder releases, tube 134 is returned to its normal cut-off condition, passing a positive pulse to tube 135. This is amplified as a negative pulse in the plate circuit of tube 135 serving to reset all of the register trigger circuits 122—125 to normal.

The manner in which the speech signals are delivered to the selected called (e. g. line 5) will not be considered in detail. An effective delay in the speech signals equal to the time difference between the calling and called lines is produced by storing the incoming speed signals for later release. To determine the proper instant for releasing these stored signals, the equipment counts the pulses which mark the time channels intervening between the calling and called line channels.

In order that this counting may start at the instant corresponding to the calling line's time channel, a synchronizing pulse from the line finder gate tube 88 over line 32 is passed through the shaping amplifier 137 to the synchronizing counter 138. Thereafter, pulses 139 produced in shaping amplifier 140 under control of oscillator 72 carry forward the operation of the system through counters such as 141, 142 and 143 in a manner similar to that described for the register circuits 122—125. Trigger circuits 123, 124 and 125 are respectively coupled to corresponding gate tubes 126, 127 and 128. These gate tubes are normally blocked at their suppressor grids and are successively unblocked as the trigger circuits operate, the one corresponding to the dialed line being left unblocked. Only three counters are shown corresponding to the three gates 126, 127 and 128, and these counters and gates cooperate to control the instant of release of speech energy to the called line. As the counters operate successively, they apply potentials to wires 144, 145, etc. But if only gate 127 is open, only the potential on wire 145 will pass to common wire 132, thus properly timing the release of speech signals to the called line as will shortly appear.

The incoming energy from the line finder gate tube 88 is applied by means of line 33 to a low-pass filter and audio amplifier 146 which serves as a storage means for the incoming speech signals. These speech signals from the output of filter 146 are continuously applied to the control grid of gate tube 121. However, no energy can pass until the completion of dialing when the cut-off bias is removed from control grid of gate tube 121 by the gate control 115, 116 and further until such time as the proper gate pulses are applied from wire 132 to cut-off gate control tube 147 which in turn removes the bias on the suppressor grid of this tube 121. The latter bias will be removed at the proper time relation depending upon which one of the gate tubes 126—128 is open at that time. The gate tube 121 will, therefore, be opened at the proper instant in accordance with the incoming line signal so that the energy from storage filter 146 will be passed only at the proper time for application to the outgoing line over lead 36.

Pulse shaping amplifier 137 is shown connected over line 32 to receive the pulses which correspond to the calling line's time channel directly from the line finder circuit. In this arrangement, the counting, therefore, will be proportional to the difference between the calling and called line and each dial should be arranged to dial such difference.

In many cases, however, it may be desirable to start the counting from a fixed zero point as derived from the synchronizing distributor itself. For this purpose, therefore, the pulse shaping amplifier 137 may be disconnected from line 36 and instead may be connected to frequency divider 73. Thus, the synchronization instead of starting from the line finder pulse (which represents different time channels for every different calling line) will start from a zero corresponding always to time channel of line 20 on the distributor, the count then being in accordance with the line number called regardless of the time position of the calling line. Preferably line 20 may be omitted in such case. This simplifies the sub-station equipment since the dials may all be the same at all stations. Furthermore, since it is not necessary to measure the time difference between the calling and called stations, multiple turns of the dial may very simply be used for signalling merely by suitably modifying the pulse forming circuit (of Fig. 5) to pass plural dialing trains, and by adding further register gates and counters.

For the sake of simplicity, the counters 138, 141—143 have been shown as comprising triodes, but will actually preferably employ tetrodes or pentodes (with the screens and suppressors conventionally biased) to improve the speed of counting, and known expedients for further increasing the speed may be used in these or other circuits. If desired, the speed requirements may be lessened by reducing the number of lines in distributor 39. Also, it should be understood that the several batteries and sources of positive and negative potential shown may be derived from one or a few power supplies, although the various potentials shown by a given symbol are not necessarily equal.

Furthermore, while we have shown an audio frequency filter circuit as a storage means for storing the incoming signals, it is clear that this type of storage means may be replaced by other types of storage means as desired. While the simple low frequency filter appears to be the most desirable form of energy storing means, it is clear that other forms of condenser storage together with the condenser charge releasing means may be provided if desired. In such a case condenser storage means must be sufficiently large so that it does not become fully charged by any incoming signal pulse and controlled so that it will release its charge to the called line each time the distributor passes the terminal corresponding to the called line.

While we have described specifically a particular embodiment of our invention and certain modifications thereof, it is to be clearly understood that this is given merely by way of illustration. Numerous changes in the circuit arrangements and in detail circuits will readily occur to those skilled in the art. Specific description, therefore, is considered merely as illustrative of our invention and not as a limitation on the scope of our invention as set forth in the objects thereof and in the accompanying claims.

What is claimed is:

1. An exchange system comprising a plurality of channels in excess of two, means for permanently assigning to all said channels different time positions in a time position cycle, means for receiving selective digit signals from any one of said channels and storing said signals, means for receiving and storing energy from said same channel, means responsive to said selective-signal-storing means for releasing said stored energy at times coinciding with the time positions of the channel represented by said selective signals, and means responsive to said releasing means for applying said released energy to said selected channel.

2. An exchange system as defined in claim 1 and in which means is provided responsive to the initiation of a call on any one of said channels for seizing and maintaining a connection between said channel and the releasing and storing means.

3. An exchange system in accordance with claim 1 in which the means responsive to the selective signal storing means comprises counting means for counting the time positions between the calling channel and the selected channel.

4. In an exchange system, means for producing communication energy and signal energy of a predetermined frequency, a plurality of lines to which said energy is applied, terminal means for each line, distributor means scanning all said terminal means in succession at a rate higher than the frequencies of said signals, whereby each line has a predetermined time position in the scanning cycle; signal responsive means for producing an effective delay in the signal energy of one of said two lines equal to the difference in time positions in the scanning cycle of two lines to be interconnected, the last-mentioned means comprising means for storing the received communication signal energy of said one line, counter means responsive to said signal energy, and means for releasing said stored energy in response to said counter means.

5. An exchange system comprising a plurality of subscriber lines, signal and communication means coupled to each line, terminal means for each of said lines, electron beam scanning means for scanning said terminals in succession at a rate higher than the communication frequency, a plurality of line finder circuits, means responsive to a predetermined voltage on one of said terminals corresponding to a calling line for transferring control voltages under control of said electron beam to a given one of said line finders to lock out other lines therefrom, selective signal register counting means coupled to each line finder circuit for counting and registering the number of a called line in response to selective signals, a line selector circuit coupled to each line finder circuit and each register means, means in said line finder circuits for storing said communication signals, means in said line selector circuits responsive to said registered number for releasing said stored energy after an interval substantially equal to the inherent time difference in the scanning cycle of the calling and called lines, and means for coupling said line selector circuits to control the beam of said electron beam scanning means to provide communication interconnection of said calling and called lines.

6. In a telephone exchange system comprising an electronic means for cyclically scanning a plurality of lines, whereby each line has a predetermined time position in said cycle, means responsive to incoming calling signals for producing a time displacement in the communication signals of a calling line equal to the time difference in said scanning cycle of said calling line and a called line comprising energy storing means, counting circuit means arranged in sectional relation and related in time delay to the time periods of said lines, means for operating said counting circuit means to provide the desired time interval, means responsive to said counting circuit means for releasing said stored energy, and means for coupling the calling line to the input of said signal storage means.

7. In a telephone exchange system comprising means for cyclically scanning a plurality of lines whereby each line has a predetermined time position in said cycle, means responsive to incoming calling signals for producing a time displacement in the communication signals of a calling line equal to the time position in the scanning cycle of the called line comprising: energy storing means for storing the communication signals, a plurality of gate circuit tubes corresponding in number to said plurality of lines, electronic counting means responsive to incoming calling signals for opening said gate circuit corresponding in timing to the called line position, and means responsive to operation of said counting circuit for releasing said stored energy to said operated gate circuit whereby said stored energy will be released in proper time displacement for application to said called line.

8. In a telephone exchange system comprising means for cyclically scanning a plurality of lines whereby each line has a predetermined time position in said cycle, means responsive to incoming calling signals for producing a time displacement in the communication signals of a calling line equal to the time position in the scanning cycle of the called line comprising energy storing means for storing the communication signals, a plurality of normally closed gate circuit tubes corresponding in number to said plurality of lines, electronic counting means responsive to incoming calling signal pulses for successively opening said gate circuits whereby a gate circuit corresponding in time to the called line position will be left open, and means responsive to operation of said counting circuit releasing said stored energy to said operated gate circuit whereby said stored energy will be released in proper time displacement for application to said called line.

9. In a telephone exchange system comprising means for cyclically scanning a plurality of lines whereby each line has a predetermined time position in said cycle, means responsive to incoming calling signals for producing a time displacement in the communication signals of a calling line equal to the time position in the scanning cycle of the called line comprising energy storing means for storing the communication signals, a plurality of gate circuit tubes corresponding in number to said plurality of lines, electronic counting means responsive to incoming calling signals for opening said gate circuit corresponding in time to the called line position, means responsive to operation of said counting circuit releasing said stored energy to said operated gate circuit whereby said stored energy will be released in proper time displacement for application to said called line, and means responsive to termination of the connection for returning said circuits to normal.

EDMOND M. DELORAINE.
PAUL R. ADAMS.

No references cited.